(12) United States Patent
In-Sung et al.

(10) Patent No.: US 9,720,447 B2
(45) Date of Patent: Aug. 1, 2017

(54) FOLDABLE DISPLAY DEVICE

(71) Applicant: Prexco Co., Ltd., Chungcheongnam-do (KR)

(72) Inventors: Song In-Sung, Gyeonggi-do (KR); Cho Seung Hee, Incheon (KR)

(73) Assignee: Prexco Co., Ltd., Chungcheongnam-do (KR)

( * ) Notice: Subject to any disclaimer, the term of this patent is extended or adjusted under 35 U.S.C. 154(b) by 0 days.

(21) Appl. No.: 15/052,102

(22) Filed: Feb. 24, 2016

(65) Prior Publication Data

US 2017/0131741 A1    May 11, 2017

(30) Foreign Application Priority Data

Nov. 6, 2015  (KR) ........................ 10-2015-0155814

(51) Int. Cl.
*G06F 1/16*    (2006.01)
(52) U.S. Cl.
CPC .......... *G06F 1/1641* (2013.01); *G06F 1/1616* (2013.01); *Y10T 16/541* (2015.01); *Y10T 16/547* (2015.01)
(58) Field of Classification Search
CPC ...... G06F 1/1616; G06F 1/166; G06F 1/1681; G06F 1/1641; G06F 1/1679; G06F 1/1656; G06F 1/1683; Y10T 16/547; Y10T 16/541
USPC ............ 361/679.02, 679.01, 679.26, 679.27, 361/679.21; 455/575.1–575, 4
See application file for complete search history.

(56) References Cited

U.S. PATENT DOCUMENTS 7,082,642 B2 *   8/2006   Su ........................ E05D 11/087
                                                        16/330

FOREIGN PATENT DOCUMENTS

KR        100909713       7/2009
KR        101237952       2/2013

* cited by examiner

*Primary Examiner* — Anthony Haughton
*Assistant Examiner* — Ingrid Wright
(74) *Attorney, Agent, or Firm* — The Dobrusin Law Firm, P.C.

(57) ABSTRACT

A foldable display device is provided, which includes a first body and a second body formed in the same plate shape and symmetrically arranged, a hinge device coupled to the first body and the second body to make the first body and the second body rotate in the range between an unfolded state in which the first body and the second body are put on the same plane and a folded state in which the first body and the second body overlap each other, and an angle maintenance device provided with first and second stopper units capable of fixing a rotating angle of the hinge device to a certain angle. Accordingly, the inclination angle of the display device can be freely adjusted to form an acute angle or an obtuse angle in addition to two folding and unfolding operations of the hinge device and the adjusted angle can be temporarily maintained to further improve convenience in use.

7 Claims, 19 Drawing Sheets

[FIG. 1A]
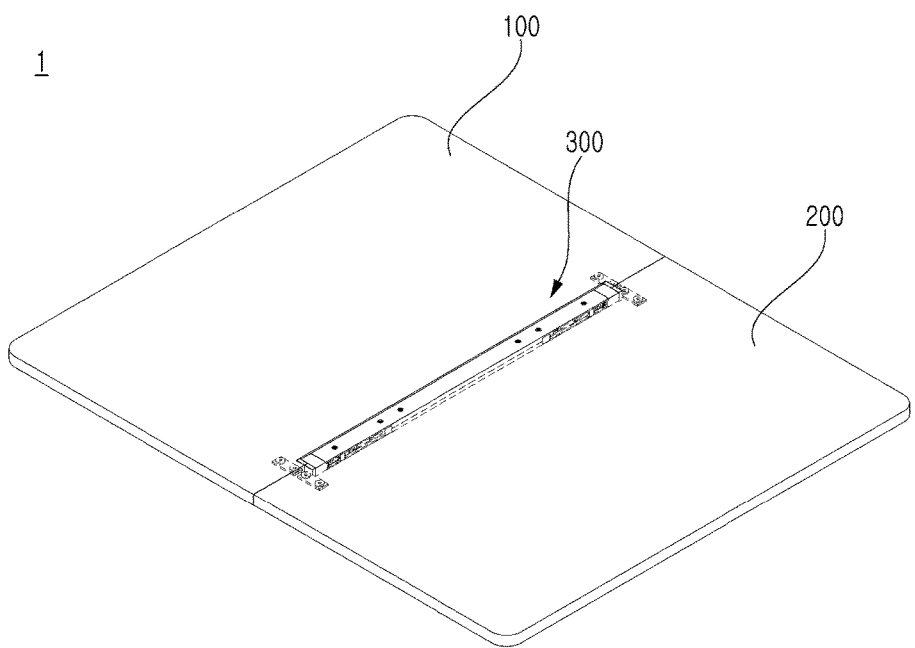

[FIG. 1B]
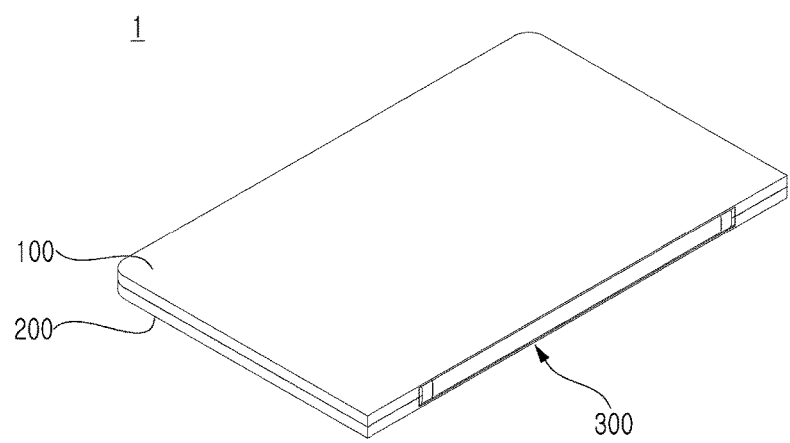

[FIG. 1C]
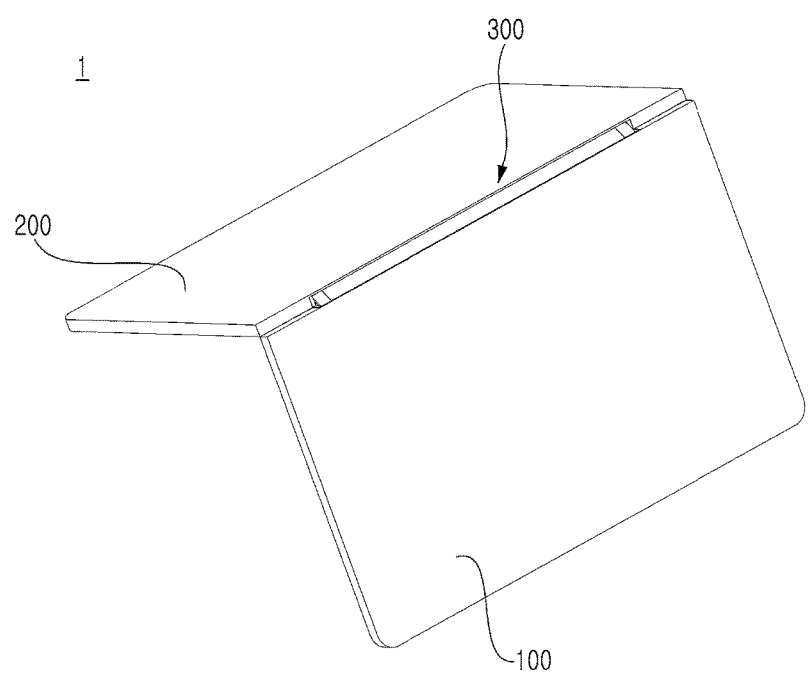

[FIG. 2]
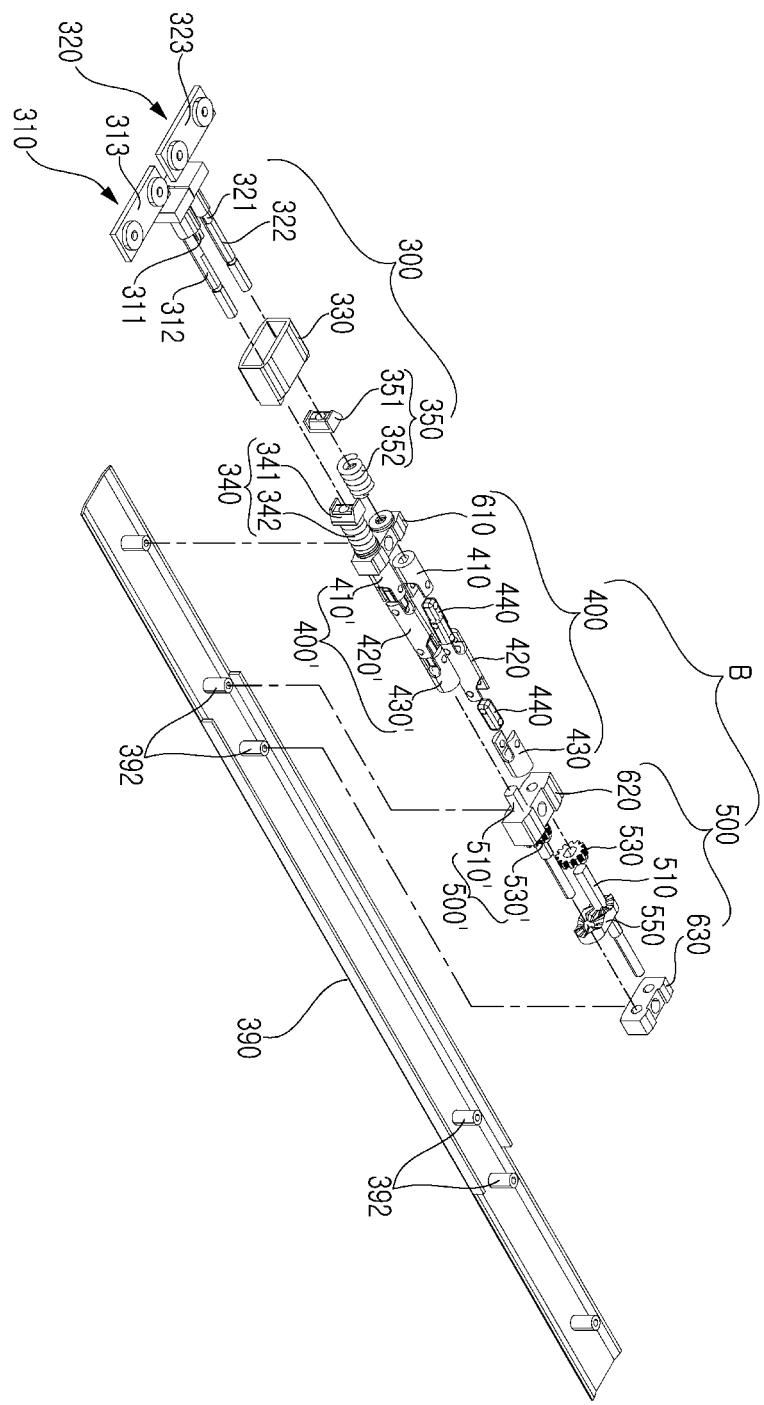

[FIG. 3]
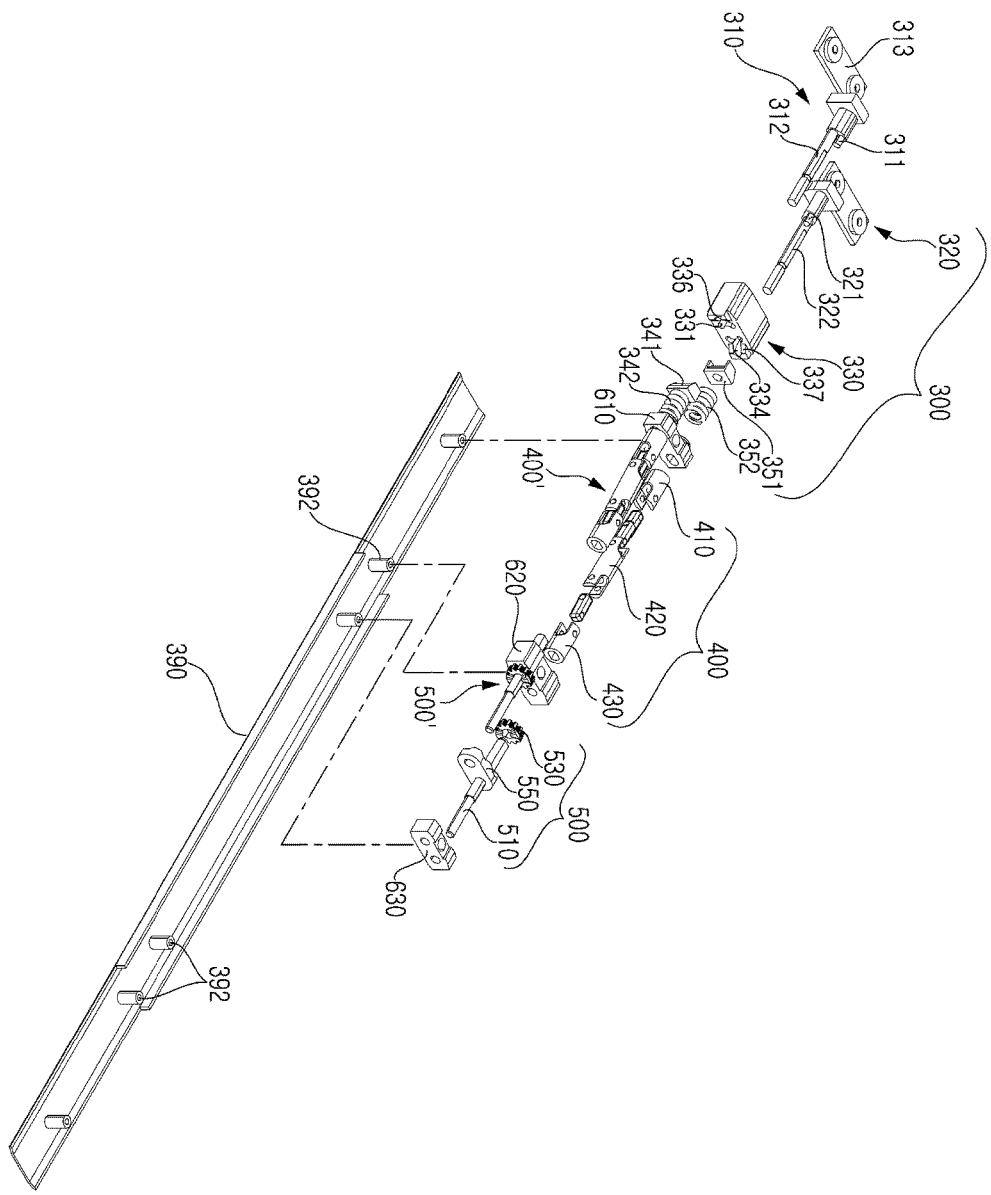

[FIG. 4]
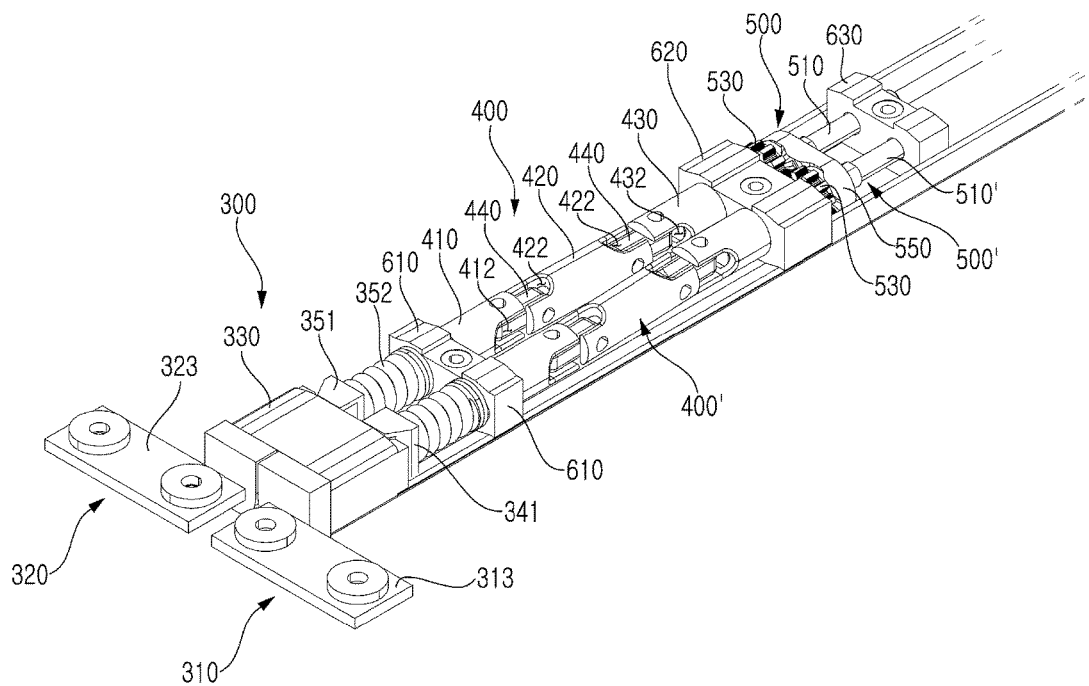

[FIG. 5]
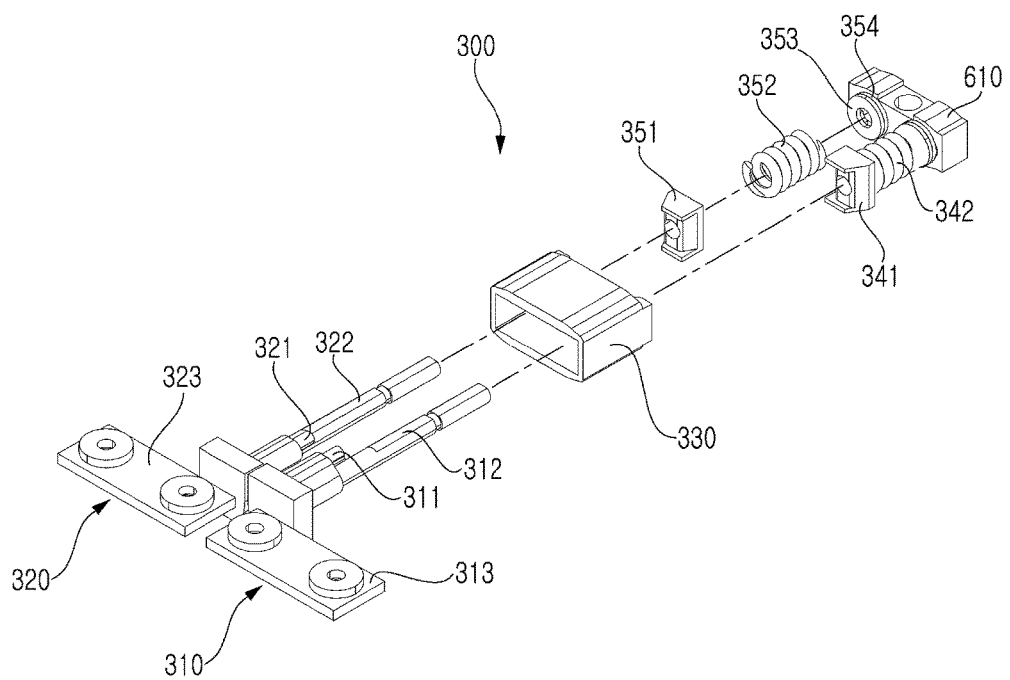

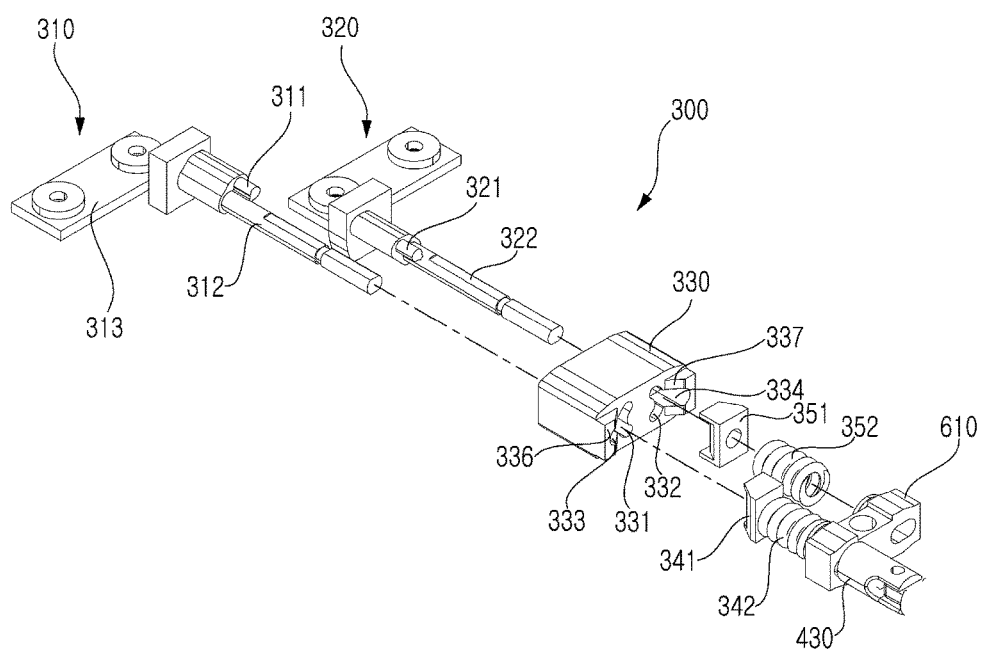
[FIG. 6]

[FIG. 7]
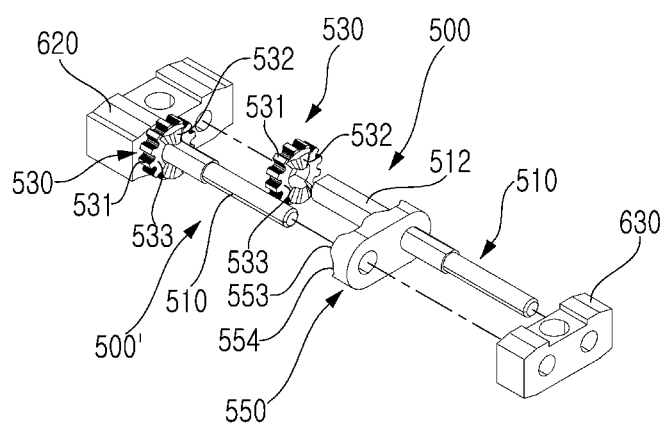

[FIG. 8]
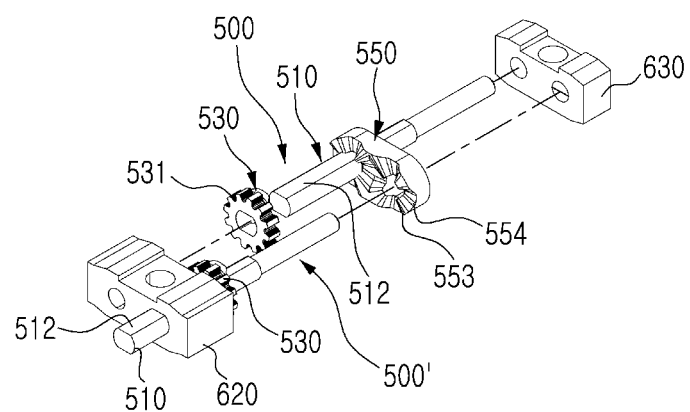

[FIG. 9]
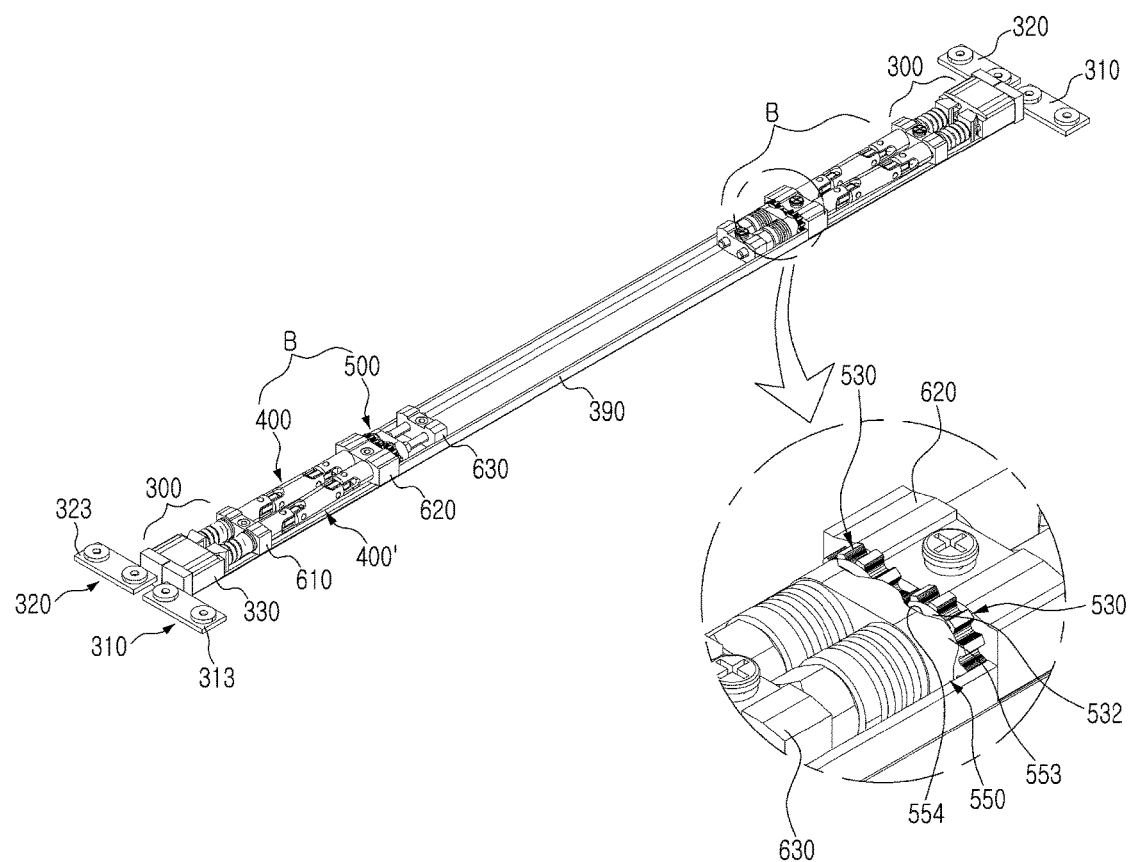

[FIG. 10A]
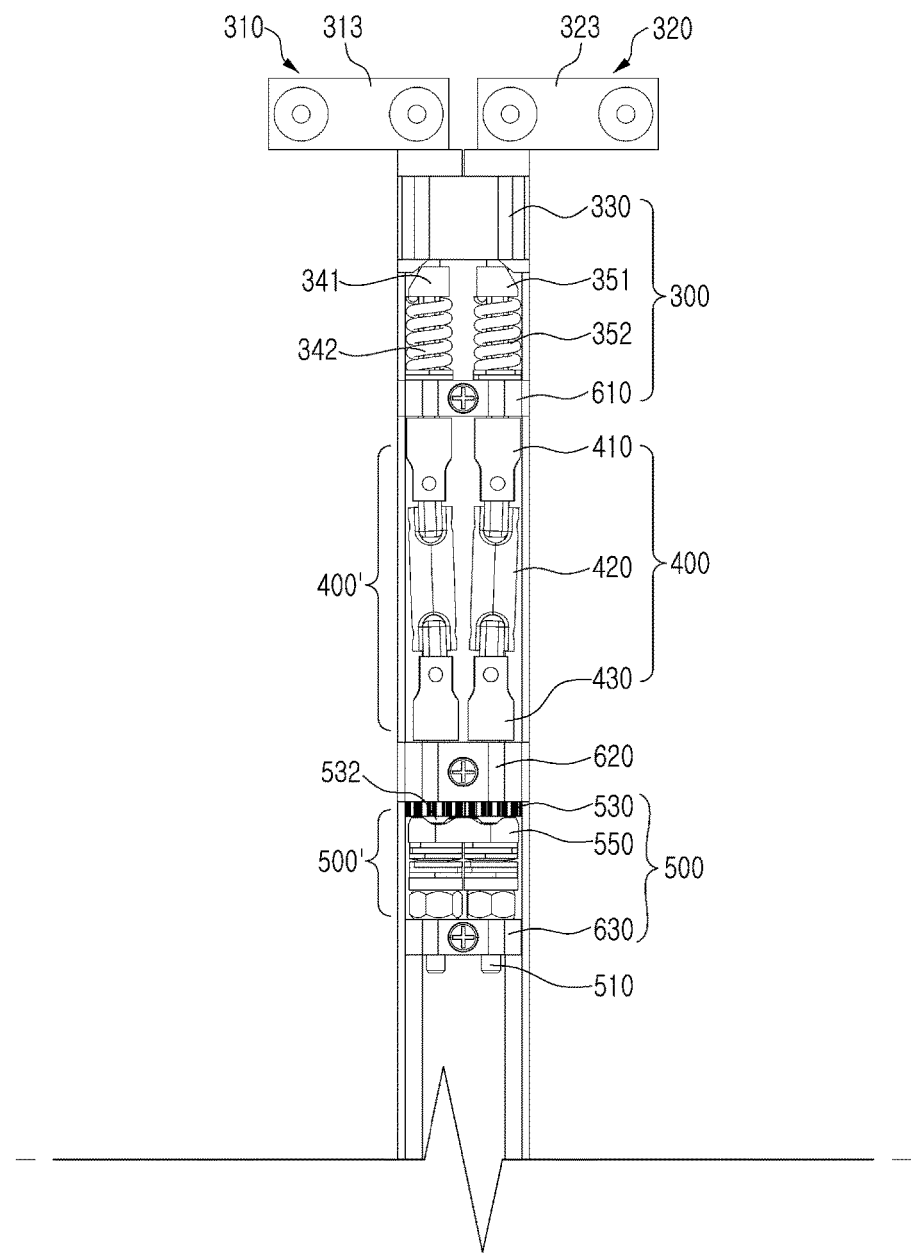

[FIG. 10B]
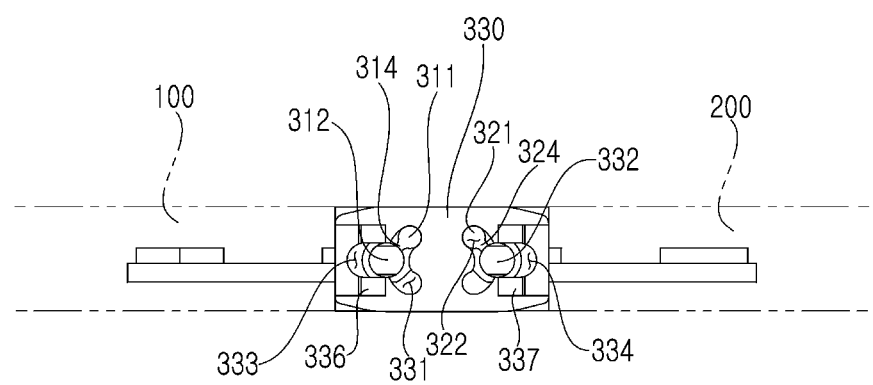

[FIG. 11]
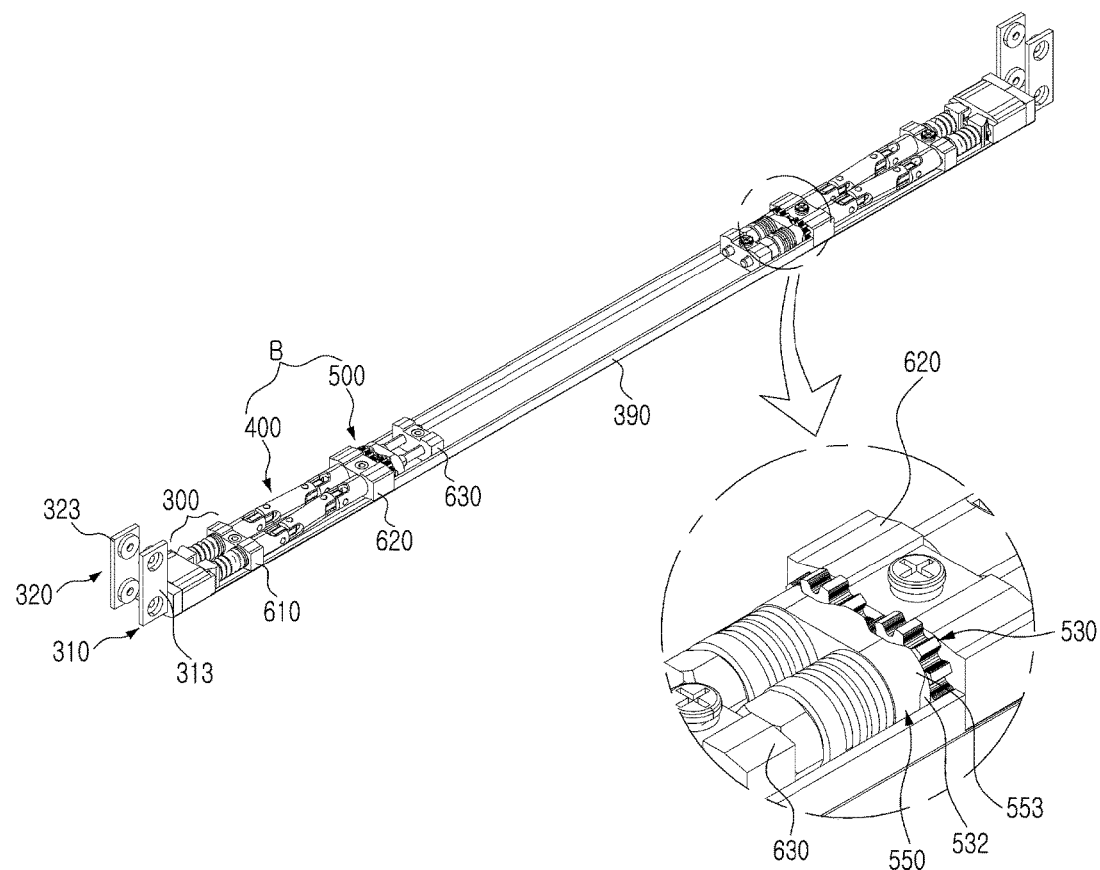

[FIG. 12A]
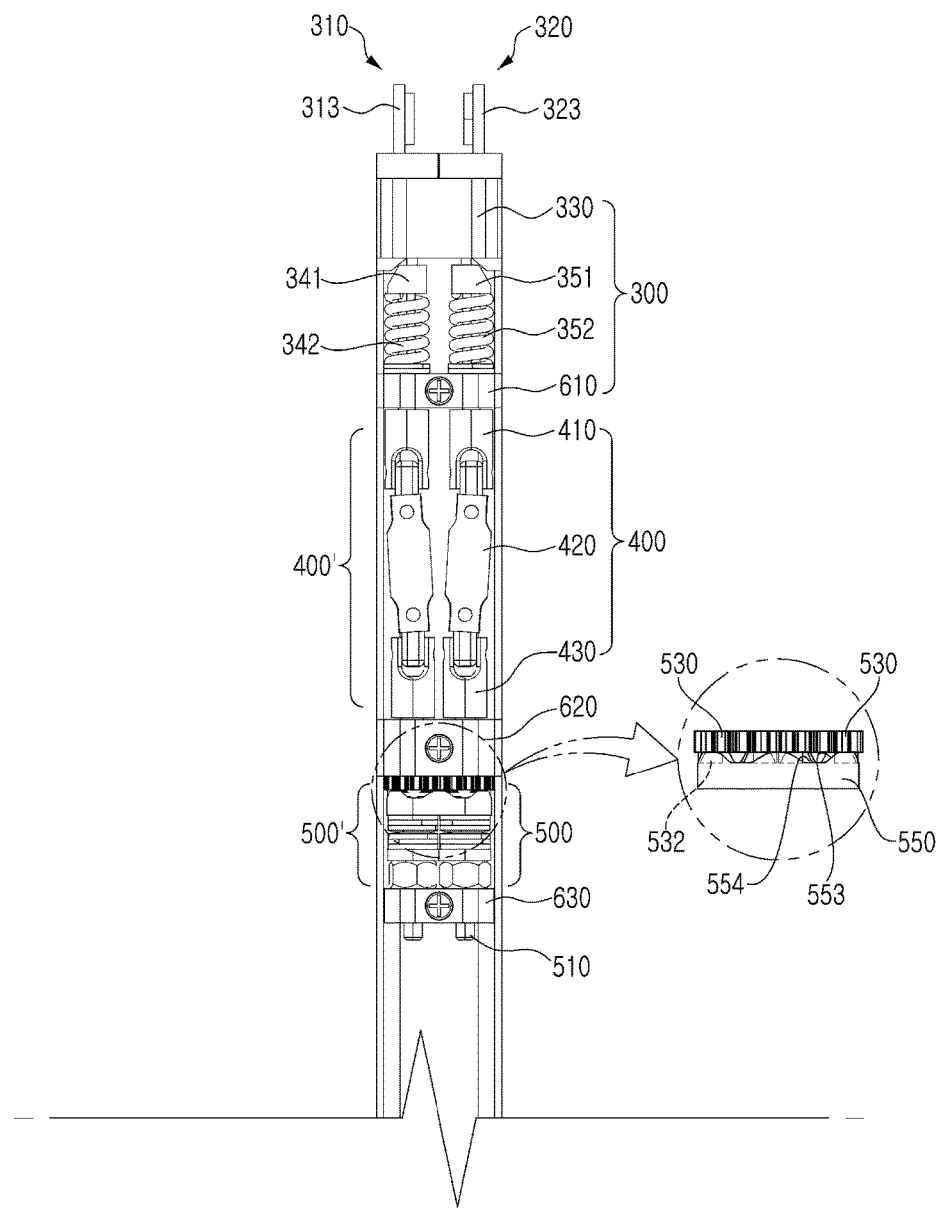

[FIG. 12B]
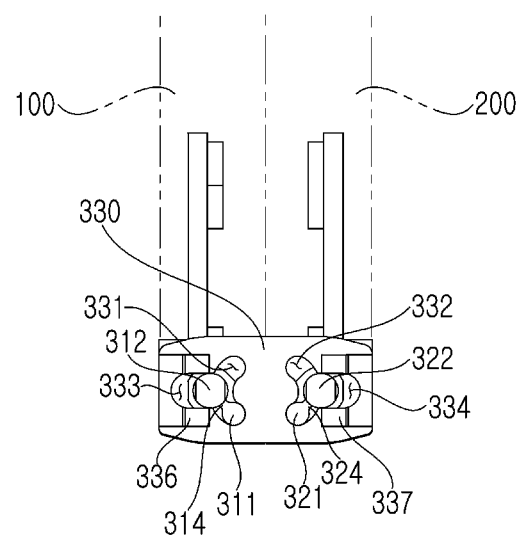

[FIG. 13]
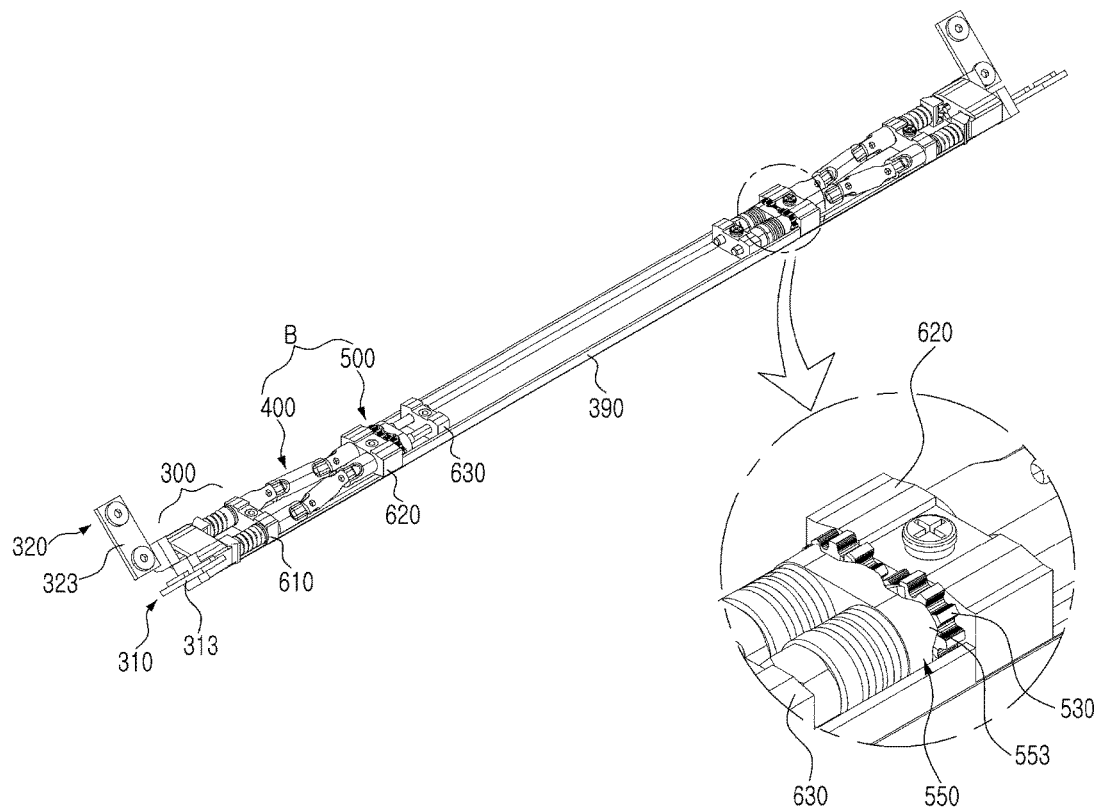

[FIG. 14A]
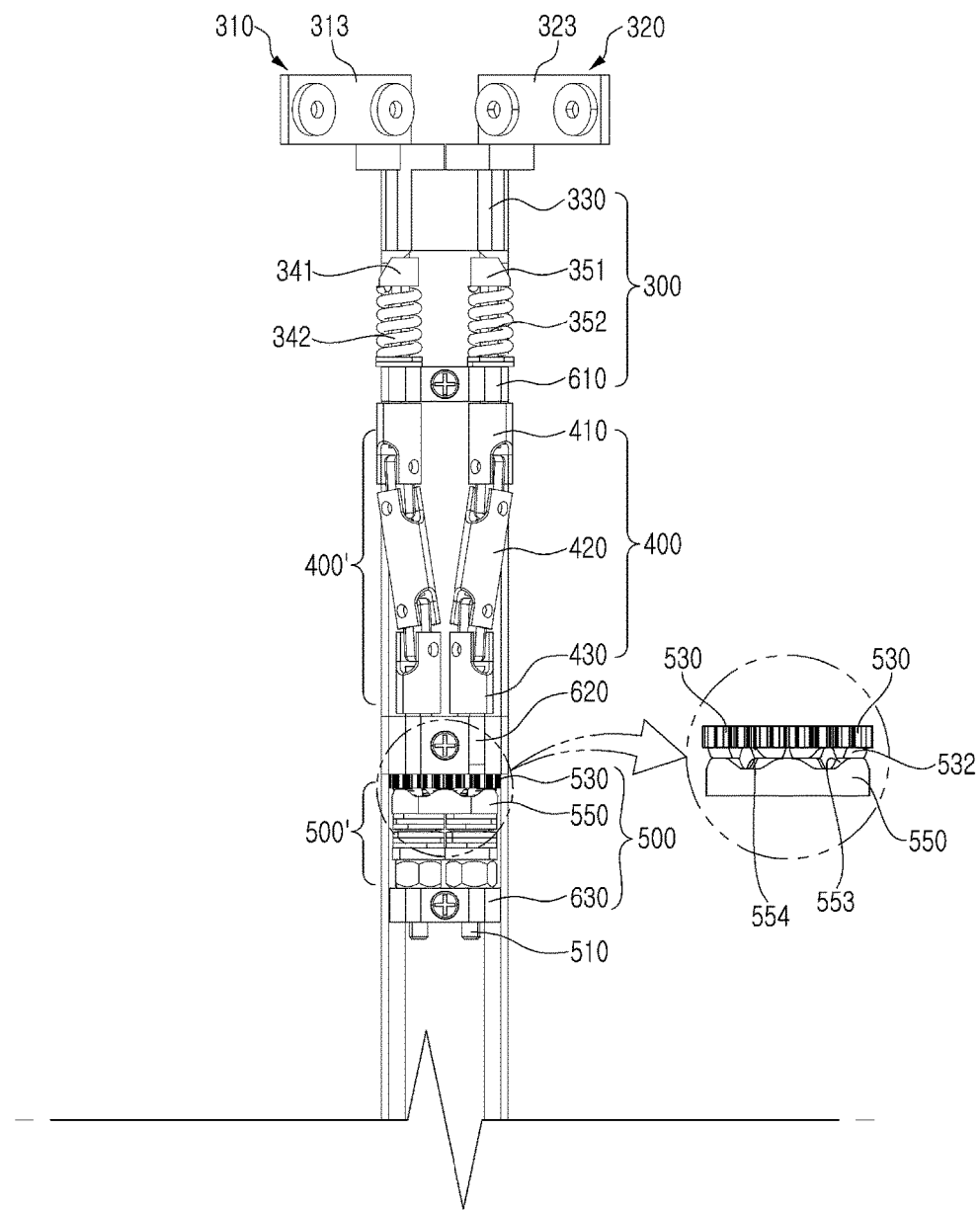

[FIG. 14B]
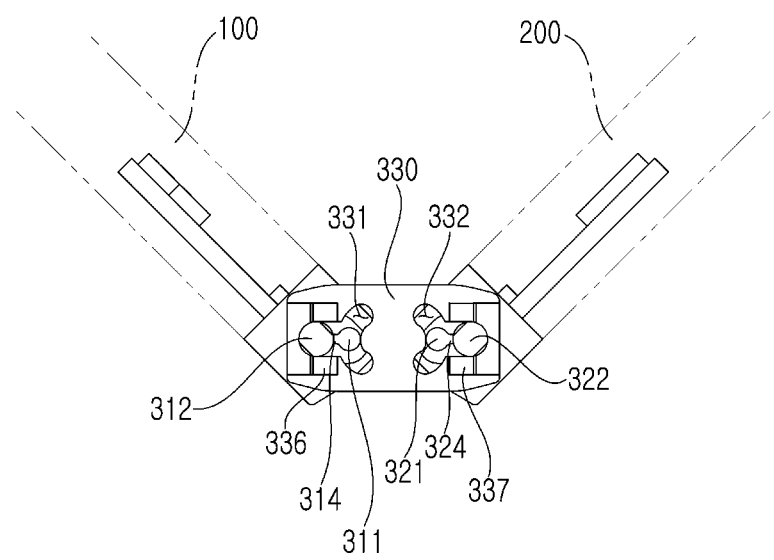

FOLDABLE DISPLAY DEVICE

CROSS-REFERENCE TO RELATED APPLICATION

This application is based on and claims priority from Korean Patent Application No. 10-2015-0155814 filed on Nov. 6, 2015 in the Korean Intellectual Property Office, the disclosure of which is incorporated herein in its entirety by reference.

TECHNICAL FIELD

The present invention relates to a hinge device and a portable electronic device having the same, and more particularly to a hinge device which can heighten the degree of close contact between a first body and a second body of an electronic device that is connected through a hinge device and can perform a semi-automatic operation smoothly.

BACKGROUND OF THE INVENTION

Industrial commands for portable electronic devices including portable terminals have been increased as years go by, and portable electronic devices having various shapes and functions that coincide with consumers' requests have appeared.

Typical portable terminals, such as portable phones, include display portions for displaying images or pictures thereon, and even portable terminals added with functions capable of viewing TV broadcasts through such display portions or visually obtaining various kinds of information using wired/wireless internet have appeared.

Further, various types of portable terminals, such as a folder type, slide type, and bar type, have been developed in accordance with consumers' requests and functional features of the portable terminals.

Here, a folder type terminal means a terminal in which two bodies having liquid crystal screens formed thereon are hinge-operated to be unfolded in order to extend an available surface area, and has been continuously developed due to its superior structural features.

Recently, with the development of thin film liquid crystal technology and miniaturization of other components, most portable terminals have generally been slimmed, and the demands for such slim portable terminals have been increased day by day.

However, since the portable terminals in the related art have been developed on the basis of their external appearances that are more suitable to perform communication functions, such as voice call or message transmission, it is somewhat inconvenient to use them for multimedia services. For example, since the display devices of the general portable terminals are configured to be long in the vertical direction, it is inconvenient for users to view digital multimedia broadcasts or moving image files through such vertically long display devices.

In order to solve this problem, Korean Registered Patent No. 10-0909713, which is a registered patent granted to the inventors of the present invention, discloses "Hinge Device for Portable Terminal". In an exemplary embodiment of this invention, in order to solve the above-described problem, the hinge device for a portable terminal is configured to rotate a cover of the portable terminal by a reference open angle and 360° in up-and-down direction while ultimately seeking the structural stability of the overall device.

According to the invention of Korean Registered Patent No. 10-0909713, user convenience can be improved, and consumers' desires to use the display portion of the portable terminal in a relatively wide range can be satisfied. However, it still leaves room for improvement, and there is a need for the development of a new type hinge device and an electronic device using the same.

For example, in order to satisfy consumer needs for a large display screen even in a small-sized electronic device, it is required to provide an electronic device in which both two bodies that are hinge-rotated are provided with liquid crystal display screens formed thereon, and if the electronic device is unfolded, the two liquid crystal display screens are combined to form one large screen. Accordingly, it is also required to develop a hinge device that fits the required electronic device.

The inventor of the present invention has filed Korean Patent Application No. 10-2011-0047360 "Hinge Device and Portable Electronic Device Having the Same", which has been granted to registration.

SUMMARY OF THE INVENTION

Accordingly, the present invention has been made to improve the invention of Korean Patent Application No. 10-2011-0047360 that is the related art, and one subject to be achieved by the present invention is to provide a foldable display device, which can freely adjust the inclination angle of the display device to form an acute angle or an obtuse angle in addition to two folding/unfolding operations of a hinge device, and can temporarily maintain the adjusted angle of the display device to improve convenience in use.

In accordance with one aspect of the present invention, there is provided a foldable display device, which includes a first body and a second body formed in the same plate shape and symmetrically arranged; and a hinge device coupled to the first body and the second body to make the first body and the second body rotate in the range between an unfolded state in which the first body and the second body are put on the same plane and a folded state in which the first body and the second body overlap each other, wherein the hinge device includes a base plate having first to third step portions formed on an upper surface of the base plate; a first rotary body formed on one side of an upper portion of the base plate, fixedly coupled to a side surface of the first rotary body, and having a first shaft formed on the first rotary body; a second shaft fixedly coupled to a side surface of the second rotary body and having a second shaft formed on the second rotary body in parallel to the first shaft; a center support body penetrated by the first shaft and the second shaft to rotatably support the first rotary body and the second rotary body; and a first elastic portion and a second elastic portion provided on an outside of the center support body to elastically support the first shaft and the second shaft so that the unfolded state or the folded state can be maintained.

The foldable display device according to the aspect of the present invention may further include an angle maintenance device provided with first and second stopper units capable of fixing a rotating angle of the hinge device to a certain angle.

The angle maintenance device may include first and second rotary interlocking means, connected to the first rotary body and the second rotary body of the hinge device, for rotating in association with the first rotary body and the second rotary body and being refracted at multiple angles; and the first and second stopper units connected to the first and second rotary interlocking means to adjust the first and second rotary interlocking means at fine angles.

Each of the first and second rotary interlocking means may include a first joint connected to the first shaft of the hinge device to be supported by the first step portion of the base plate; a third joint supported by the second step portion and arranged to be spaced apart from the first joint; a second joint arranged between the first joint and the third joint; and a connecting rod having one side coupled to both end portions of the second joint and the other side coupled to the first joint and the third joint through pins.

The first joint may be a hollow cylindrical body, a first cutting groove may be formed on both side surfaces of one side of the first joint, and the first cutting groove may be formed to communicate with an opening of a front end of the first joint.

The third joint may be a hollow cylindrical body, a third cutting groove may be formed on both side surfaces of one side of the third joint, and the third cutting groove may be formed to communicate with an opening of a front end of the third joint.

The second joint may be a hollow cylindrical body, a second cutting groove may be formed at both end portions of the second joint at right angles to the first cutting groove and the third cutting groove, and the second cutting groove may be formed to communicate with an opening of the both end portions.

Each of the first and second stopper units may include an operation shaft penetrating the second step portion of the base plate to be coupled to the third step portion and having one end connected to the third joint; a first cam supported by one side of the second step portion, having a gear drive formed on an outer periphery thereof, and having one surface on which a first projection portion and a first recessed portion are alternately formed to be coupled to the operation shaft; and a second cam coupled to the operation shaft, and having one surface on which a third projection portion and a fourth recessed portion are alternately formed to face the first cam.

According to the present invention, since the inclination angle of the display device can be freely adjusted to form the acute angle or the obtuse angle in addition to two folding and unfolding operations of the hinge device and the adjusted angle can be temporarily maintained, the convenience in use can be further improved.

BRIEF DESCRIPTION OF THE DRAWINGS

The above objects, other features and advantages of the present invention will become more apparent by describing the preferred embodiments thereof with reference to the accompanying drawings, in which:

FIGS. 1A to 1C are perspective views of a foldable display device according to an embodiment of the present invention, wherein FIG. 1A illustrates an unfolded state of the foldable display device, FIG. 1B illustrates a folded state of the foldable display device, and FIG. 1C illustrates an unfolded state of the foldable display device by 90°;

FIGS. 2 and 3 are exploded perspective views illustrating a hinge device in a foldable display device according to an embodiment of the present invention;

FIG. 4 is an enlarged view of a hinge device in a foldable display device according to an embodiment of the present invention;

FIGS. 5 and 6 are enlarged exploded perspective views of a hinge device in a foldable display device according to an embodiment of the present invention;

FIGS. 7 and 8 are enlarged exploded perspective views of a stopper unit in a foldable display device according to an embodiment of the present invention;

FIG. 9 is a perspective view of a hinge device in an unfolded state in a foldable display device according to an embodiment of the present invention;

FIG. 10A is an enlarged plan view of a main part in FIG. 9;

FIG. 10B is a partial cross-sectional view of FIG. 10A;

FIG. 11 is a perspective view of a hinge device in a folded state in a foldable display device according to an embodiment of the present invention;

FIG. 12A is an enlarged plan view of a main part in FIG. 11;

FIG. 12B is a partial cross-sectional view of FIG. 12A;

FIG. 13 is a perspective view of a hinge device in an unfolded state by 90° in a foldable display device according to an embodiment of the present invention;

FIG. 14A is an enlarged plan view of a main part in FIG. 13;

FIG. 14B is a partial cross-sectional view of FIG. 14A.

DETAILED DESCRIPTION OF THE INVENTION

Hereinafter, preferred embodiments of the present invention will be described in detail with reference to the accompanying drawings.

The embodiments to be described hereinafter are nothing but specific details provided to assist those of ordinary skill in the art in a comprehensive understanding of the invention, and thus do not mean that the technical idea and scope of the present invention are limited thereto.

Further, the sizes or shapes of constituent elements illustrated in the drawings may be exaggerated for clarity and convenience in explanation. Further, all terms that are specially defined in consideration of the configuration and operation of the present invention may differ depending on intentions of a user or an operator or customs, and thus they should be defined on the basis of the contents of the whole description of the present invention.

As illustrated in FIGS. 1A to 1C, a foldable display device according to an embodiment of the present invention includes a first body and a second body formed in the same plate shape and symmetrically arranged, and a hinge device coupled to the first body and the second body to make the first body and the second body rotate in the range between an unfolded state in which the first body and the second body are put on the same plane and a folded state in which the first body and the second body overlap each other.

The foldable display device is a portable display device, and may be in the form of a notebook computer, an electronic dictionary, a PDA, or a typical portable terminal, such as a portable phone.

The first body 100 and the second body 200 constitute a body of the foldable display device 1, and are formed to rotate with each other.

On the first body 100, an image portion that is composed of an LCD (Liquid Crystal Display) to display a visual image may be formed, and on the second body 200, a keypad for inputting information may be formed. However, the foldable display device 1 according to a preferred embodiment of the present invention, as illustrated in FIG. 1A, is configured in a manner that a first image portion 110 is formed on the first body 100, and a second image portion 210 is formed on the second body 200.

Further, the first image portion 110 is formed up to a lower end of the first body 100, and the second image portion 210 is formed up to an upper end of the second body 200. Here, the first body 100 and the second body 200 come in close contact with each other so that the lower end of the first image portion 110 and the upper end of the second image portion 210 come in close contact with each other in the unfolded state as described above.

In the foldable display device 1 according to a preferred embodiment of the present invention, the first body 100 and the second body 200 are symmetrically formed and come in close contact with each other in the unfolded state. The image portion is formed on both the first body 100 and the second body 200. Accordingly, in the foldable display device 1 according to a preferred embodiment of the present invention, the first image portion 110 and the second image portion 210 are combined to form one large image portion in the unfolded state, and thus visual information can be displayed over such a large image portion.

The first image portion 110 and the second image portion 210 may be in the form of a touch screen, and thus they may be used as not only means for displaying information but also means for inputting the information.

In the present invention, explanation of directions will be made based on the unfolded state in which the first image portion 110 and the second image portion 210 are directed upward and the center support body 330 is directed forward.

As illustrated in FIGS. 2 to 8, the hinge device 300 is configured to include a base plate 390 having first to third step portions 610, 620, and 630 formed on an upper surface of the base plate 390; a first rotary body 310 formed on one side of an upper portion of the base plate 390, fixedly coupled to a side surface of the first rotary body 100, and having a first shaft 312 formed on the first rotary body 310; a second shaft 320 fixedly coupled to a side surface of the second rotary body 200 and having a second shaft 322 formed on the second rotary body 200 in parallel to the first shaft 322; a center support body 330 penetrated by the first shaft 312 and the second shaft 322 to rotatably support the first rotary body 310 and the second rotary body 320; and a first elastic portion 340 and a second elastic portion 350 provided on an outside of the center support body 330 to elastically support the first shaft 312 and the second shaft 322 so that the unfolded state or the folded state can be maintained.

The base plate 390 is formed of a rectangular plate material, and on the upper portion of the base plate 390, the hinge device 300 and an angle maintenance device B are symmetrically formed on both left and right sides, and a plurality of bosses 392 are formed so that the first to third step portions 610, 620, and 630 are coupled thereto.

The hinge device 300 is a device that is symmetrically formed to make the first body 100 and the second body 200 rotatably connected to each other.

Accordingly, the hinge device 300 is configured to briefly include the first rotary body 310 coupled to the first rotary body 100, the second shaft 320 formed symmetrically to the first rotary body 310 and coupled to the second rotary body 200, and the center support body 330 connecting the first rotary body 310 and the second rotary body 320 to each other.

The hinge device 300 is formed at the same height (in the connected portion) as the height of the first body 100 and the second body 200, and is coupled to the end portion of the outside of the portion in which the first body 100 and the second body 200 are coupled to each other. Further, in order for the hinge device 300 to be coupled to the first body 100 and the second body 200 without projecting therefrom, grooves (not denoted by drawing reference numerals) are formed at corners of the first body 100 and the second body 200 so that the hinge device 300 is inserted and coupled thereto.

Although only one hinge device 300 may be formed on any one of the first body 100 and the second body 200, it is preferable that two hinges are provided to be coupled to both sides of the first body 100 and the second body 200, and in this case, the two hinge devices 300 are in the same shape. Further, the hinge devices 300 are connected by a connection plate 390.

The first rotary body 310 is fixedly coupled to the first body 100, and the second rotary body 320 is fixedly coupled to the second body 200. As described above, since the first rotary body 310 and the second rotary body 320 are symmetrically formed to each other, for convenience in explanation, unless specially mentioned, the explanation of the second rotary body 320 is replaced by the explanation of the first rotary body 310.

The center support body 330 forms the center of the hinge device 300, and rotatably supports the first rotary body 310 and the second rotary body 320. Further, the center support body 330 is in a symmetrical shape, and a first operation slot 331 and a second operation slot 332 are formed in the center portion thereof, while a first reciprocating slot 333 and a second reciprocating slot 334 are formed on both left and right sides thereof. Further, the first operation slot 331 and the first reciprocating slot 333, and the second operation slot 332 and the second reciprocating slot 334 communicate with each other.

The first operation slot 331, into which a first operation projection 311 to be described later is inserted to slide, is outwardly curved. Accordingly, during rotation, the first rotary body 310, on which the first operation projection 311 that slides along the first operation slot 331 is formed, may move outwardly for a predetermined portion, and then may move inwardly. As a result, the first body 100 and the second body 200 come in close contact with each other in the unfolded state, and are naturally rotated in the process in which they are shifted to the folded state.

The second operation slot 332 is formed symmetrically to the first operation slot 331, and a second operation projection 321 is inserted into the second operation slot 332 to slide.

The first reciprocating slot 333 is formed long from the outer side of the center support body 330 in left/right direction, and is formed at a height that corresponds to the middle of the center support body 330. The first reciprocating slot 333, into which a first shaft 312 to be described later is inserted to slide, is formed in a linear shape. Further, the first reciprocating slot 333 communicates with the first operation slot 331, and the inner end portion of the first reciprocating slot 333 is connected to the center portion of the first operation slot 331. Accordingly, when the first shaft 312 is rotated, it can move for a predetermined portion to the region of the first operation slot 331, and thus the length in the outward direction of the first reciprocating slot 333 can be reduced, resulting in that the length in the left/right direction of the center support body 330 is reduced.

The second reciprocating slot 334 is formed symmetrically to the first reciprocating slot 333, and the second shaft 322 is inserted therein to slide.

On the outer side surface of the center support body 330, a first center inclined portion 336 and a second center inclined portion 337, which have inclined surfaces that become higher as going from the peripheries of the first reciprocating slot 333 and the second reciprocating slot 334 toward the left and right side surfaces, are formed.

The second center inclined portion 337 is formed symmetrically to the first center inclined portion 336.

On the first rotary body 310, a first fastening plate 313, which is formed to be bent in a direction that is perpendicular to the formation direction of the first operation projection 311 and the first shaft 312, that is, in the formation direction of the first body 100, is formed, and the first fastening plate 313 is in a relatively wide plate shape and is coupled to the first body 100. A second fastening plate 323 that corresponds to the first fastening plate 313 is formed on the second rotary body 320 and is coupled to the second body 200.

The first operation projection 311 is formed to be inclined from top to inside of the first rotary body 310 in a circular projection shape and to penetrate the first operation slot 331 to be locked therein. However, the first operation projection 311 does not project out of the first operation slot 331.

The first shaft 312 is formed to be inclined toward the outside of the first rotary body 310 and to penetrate the first reciprocating slot 333 to be locked therein. However, the first shaft 312 is not formed to be short like the first operation projection 311, but is formed to be long enough to be fastened to a first elastic cam and a first spring through penetration of the first reciprocating slot 333.

On the second rotary body 320, a second operation projection 321, a second shaft 322, and a second fastening plate 323 are formed, and the second rotary body 320 is formed symmetrically to the first rotary body 310. The second rotary body 320 is rotated to slide based on the center support body 330, and may be rotated regardless of the rotation of the first rotary body 310.

Here, the unfolded state and the folded state will be briefly described.

In the unfolded state, the first body 100 and the second body 200 are formed on the same plane, and the angle that is formed between the first body 100 and the second body 200 becomes 180°.

In the folded state, the first body 100 and the second body 200 overlap each other, and the angle that is formed between the first body 100 and the second body 200 becomes 0°.

Further, in the middle state between the unfolded state and the folded state, the angle that is formed between the first body 100 and the second body 200 may become about 90°.

As illustrated in FIG. 10B, in the unfolded state, the first operation projection 311 and the second operation projection 321 are positioned at the upper ends of the first operation slot 331 and the second operation slot 332, and the first shaft 312 and the second shaft 322 are positioned at inner end portions of the first reciprocating slot 333 and the second reciprocating slot 334. That is, the first body 100 and the second body 200, which are fixedly coupled to the first rotary body 310 and the second rotary body 320 that are elastically supported by the first elastic portion 340 and the second elastic portion 350, are positioned on the same plane, and the unfolded state can be elastically and stably maintained (unless an external force strong enough to overcome the unfolded state is applied, the unfolded state is stably maintained).

Further, as illustrated in FIG. 12B, in the folded state, the first operation projection 311 and the second operation projection 321 are positioned at the lower ends of the first operation slot 331 and the second operation slot 332, and the first shaft 312 and the second shaft 322 are positioned at the inner end portions of the first reciprocating slot 333 and the second reciprocating slot 334. That is, the first body 100 and the second body 200, which are fixedly coupled to the first rotary body 310 and the second rotary body 320 that are elastically supported by the first elastic portion 340 and the second elastic portion 350, are folded, and the folded state can be elastically and stably maintained (unless an external force strong enough to overcome the folded state is applied, the folded state is stably maintained).

A first joint portion 314 that connects the first shaft 312 and the first operation projection 311 to each other is formed on the first rotary body 310, and a second joint portion 324 that connects the second shaft 322 and the second operation projection 321 to each other is formed on the second rotary body 320.

The first joint portion 314 is substantially concavely formed with a thickness that is thinner than the thickness of the first shaft 312 and the first operation projection 311 so as not to disturb the movement of the first shaft 312 and the first operation projection 311, and is positioned adjacent to a portion in which the first operation slot 331 and the first reciprocating slot 333 are connected to each other. Further, the second joint portion 324 may be formed symmetrically to the first joint portion 314.

The first shaft 312 and the second shaft 322 are formed to project, and the first elastic portion 340 and the second elastic portion 350 are coupled thereto to apply elastic forces thereto. In this case, the first shaft 312 and the second shaft 322 may have relatively heavy loads, and the first joint portion 314 and the second joint portion 324 mitigate such loads and firmly maintain the first shaft 312 and the second shaft 322.

The first elastic portion 340 and the second elastic portion 350 elastically support the first rotary body 310 and the second rotary body 320, and enable the hinge device 300 to perform semi-automatic operation and make it possible to stably maintain the unfolded state and the folded state.

The first elastic portion 340 is coupled to the first shaft 312, and presses the first shaft 312 so that the first shaft 312 stays on the inside of the first reciprocating slot 333 (interior of the center support body 330). Further, the first elastic portion includes a first elastic cam, a first spring, a first O-ring, and a first washer.

The first elastic cam 341 is fitted into the first shaft 312 to form an inclined surface to correspond to the first center inclined portion 336. The first elastic cam 341 is not interference-fitted into the first shaft 312, but is substantially fitted therein so that the first elastic cam 341 slides smoothly on the basis of the first shaft 312. If the first shaft 312 moves along the first reciprocating slot 333 in a state where the first elastic cam 341 comes in close contact with a first center inclined portion 366, the first elastic cam 341 moves along the inclined surface of the first center inclined portion 366.

The first spring 342 is in a coil spring shape, and is fitted into the first shaft 312 to press the first elastic cam 341 toward the first center inclined portion 366. The first spring 342 establishes an elastic force when being compressed, and is assembled with the first shaft 312 in somewhat compressed state.

The first O-ring 343 is fitted to an outside of the first spring 342 to prevent the first spring 342 from seceding from the first shaft 312, and the first washer 344 is fixed to the end portion of the first shaft 312 to support the first O-ring 343 and to make the first elastic member 340 fixed onto the first shaft 312.

The first elastic member 340 presses the first shaft 312 so that the first shaft 312 stays on the inside of the first reciprocating slot 333 (center side of the center support body 330), and thus the first operation projection 311 stays at the upper end or lower end of the first operation slot 331, resulting in the semi-automatic operation of the first body 100.

The second elastic portion 350 is formed symmetrically to the first elastic portion 340, and the second rotary body 320 is rotated to slide on the basis of the center support body 330, resulting in the semi-automatic operation of the first body 100.

[Rotary Interlocking Means]

In an embodiment of the present invention, the foldable display device further includes an angle maintenance device B provided with first and second stopper units 500 and 500' capable of fixing the rotating angle of the hinge device 300 to a certain angle.

The angle maintenance device B includes first and second rotary interlocking means 400 and 400', connected to the first rotary body 310 and the second rotary body 320 of the hinge device 300, for rotating in association with the first rotary body 310 and the second rotary body 320 and being refracted at multiple angles; and the first and second stopper units 500 and 500' connected to the first and second rotary interlocking means 400 and 400' to adjust the first and second rotary interlocking means 400 and 400' at fine angles.

The first and second rotary interlocking means 400 and 400' include first joints 410 and 410' connected to the first and second shafts 312 and 321 to be supported by the first step portion 610; third joints 430 and 430' supported by the second step portion 620 and arranged to be spaced apart from the first joints 410 and 410'; second joints 420 and 420' arranged between the first joints 410 and 410' and the third joints 430 and 430'; and a connecting rod 440 having one side coupled to both end portions of the second joints 420 and 420' and the other side coupled to the first joints 410 and 410' and the third joints 430 and 430' through pins.

The first joints 410 and 410' are in the shape of a hollow cylindrical body, and first cutting grooves 412 are formed on both side surfaces of one side thereof. The first cutting grooves 412 are in an elliptical shape, each of which has one side that communicates with the opening of the front end thereof, and are symmetrically formed on both side surfaces of the first joints 410 and 410'.

The third joint 430 has the same shape as the first joint 410, and is arranged symmetrically to the first joint 410.

Accordingly, the third joints 430 and 430' are in the shape of a hollow cylindrical body, and third cutting grooves 432 are formed on both side surfaces of one side of the third joint. The third cutting grooves 432 are formed to communicate with the openings at the front ends thereof, and the openings at the other end thereof are formed to have elliptical cross-section so as to be interference-fitted into the operation shaft to be described later.

The second joints 420 and 420' are in the shape of a hollow cylindrical body, and second cutting grooves 422 are formed at both end portions of the second joints 420 and 420' to be perpendicular to the first cutting grooves 412 and the third cutting grooves 432. The second cutting grooves 422 are formed to communicate with the openings of the both end portions thereof.

Accordingly, the first to third joints 410, 410', 420, 420', 430, and 430' are connected to fins through two connecting rods 440 to have refraction functions, and thus can rotate on their axes substantially by 360° (see FIGS. 10A, 12A, and 14A).

The first and second stopper units 500 and 500' include operation shafts 510 and 510' penetrating the second step portion 620 of the base plate 390 to be coupled to the third step portion 630 and having ends connected to the third joint 430; first cams 530 and 530' supported by one side of the second step portion 620, having a gear drive 531 formed on an outer periphery thereof, and having surfaces on which a first projection portion 532 and a first recessed portion 533 are alternately formed to be coupled to the operation shafts 510 and 610'; and a second cam 550 coupled to the operation shafts 510 and 510', and having surfaces on which a third projection portion 553 and a fourth recessed portion 554 are alternately formed to face the first cams 530 and 530'.

The operation shafts 510 and 510' have cut surfaces 512 formed on both sides of one side surface and fitted into the third joint 430 and the first cams 530 and 530', and the second cam 550 to be rotated in a body, and portions fitted into the third step portion 630 are in a cylindrical shape.

Accordingly, since the third joints 430 and 430' and the first cams 530 and 530', and the operation shafts 510 and 510' move in a body, the first cams 530 and 530' are rotated by the rotation of the third joint 430, and the first projection portions 530 of the first cams 530 and 530' are selectively engaged with certain positions of the third projection portion 553 or the fourth recessed portion 554 of the second cam 550 to perform cam operation.

As the first projection portion 532 and the first recessed portion 533 of the first cams 530 and 530' and the third projection portion 553 and the fourth recessed portion 554 of the second cam 550 are further sub-divided, they can be fixed at smaller angles, and thus more elaborate operation can be performed.

Hereinafter, referring to the drawings, an unfolding operation, a folding operation, and a 90° spreading operation will be described.

[Unfolding Operation]

The unfolding operation is completed when the first body 100 and the second body 200 are on the same plane to form a wide plate as a whole.

As illustrated in FIGS. 2, 9, 10A, and 10B, the first fastening plate 313 and the second fastening plate 323 become in a horizontal state.

The first operation projection 311 and the second operation projection 321 are positioned at upper ends of the first operation slot 331 and the second operation slot 332, and the first shaft 312 and the second shaft 322 are positioned inside the first reciprocating slot 333 and the second reciprocating slot 334.

Further, the first rotary body 310 and the second rotary body 320 are elastically supported by the first elastic portion 340 and the second elastic portion 350, and this state is maintained unless an external force enough to overcome the elastic force of the first elastic portion 340 and the second elastic portion 350 is applied thereto.

That is, the first elastic cam 341 is pressed by the first spring 342 to stay on the lower side of the first center inclined portion 336, and rotation of the first rotary body 310 is impeded unless an external force to the extent that the first elastic cam 341 can ascend along the inclined surface of the first center inclined portion 336 is applied thereto.

On the other hand, the first joints 410 and 410', the second joints 420 and 420', and the third joints 430 and 430', which are connected to the first and second shafts 312 and 321, are rotated together.

If the operation shafts 510 and 510' connected to the third joints 430 and 430' are rotated and the first cams 530 and 530' coupled to the operation shafts 510 and 510' are rotated, the first projection portion 532 is fitted and inserted into the fourth recessed portion 554 of the second cam 550.

As illustrated in FIG. 9, the first projection portion 532 is arranged in the longitudinal direction and is fixedly fitted into the fourth recessed portion 554.

[Folding Operation]

As illustrated in FIGS. 11, 12A, and 12B, the first fastening plate 313 and the second fastening plate 323 are rotated upwardly from the unfolded state as described above, and become in a vertical state.

The first operation projection 311 and the second operation projection 321 are positioned at lower ends of the first operation slot 331 and the second operation slot 332, and the first shaft 312 and the second shaft 322 are positioned inside the first reciprocating slot 333 and the second reciprocating slot 334.

Further, the first rotary body 310 and the second rotary body 320 are elastically supported by the first elastic portion 340 and the second elastic portion 350, and this state is maintained unless an external force enough to overcome the elastic force of the first elastic portion 340 and the second elastic portion 350 is applied thereto.

That is, the first elastic cam 341 is pressed by the first spring 342 to stay on the lower side of the first center inclined portion 336, and the rotation of the first rotary body 310 is impeded unless an external force to the extent that the first elastic cam 341 can ascend along the inclined surface of the first center inclined portion 336 is applied thereto.

On the other hand, the first joints 410 and 410', the second joints 420 and 420', and the third joints 430 and 430', which are connected to the first and second shafts 312 and 321, are rotated together.

If the operation shafts 510 and 510' connected to the third joints 430 and 430' are rotated and the first cams 530 and 530' coupled to the operation shafts 510 and 510' are rotated, the first projection portion 532 is fitted and inserted into the fourth recessed portion 554 of the second cam 550.

As illustrated in FIG. 11, the first projection portion 532 is rotated by 90° from the unfolded state as described above to be arranged in the transverse direction, and is fixedly fitted into the fourth recessed portion 554.

[90° Spreading Operation]

As illustrated in FIGS. 13, 14A, and 14B, the first fastening plate 313 and the second fastening plate 323 are respectively rotated upwardly by 45° from the unfolded state as described above.

If needed, the angle set between the first fastening plate 313 and the second fastening plate 323 may be set to an acute angle or an obtuse angle.

As the first rotary body 310 and the second rotary body 320 are rotated on the basis of the center support body 330 by an external force, the first operation projection 311 is put on the middle position of the first operation slot 331, and the first shaft 312 moves in the outside direction of the first reciprocating slot 333.

On the contrary, the second operation projection 321 and the second shaft 322 of the second rotary body 320 are symmetrically rotated.

On the other hand, the first joints 410 and 410', the second joints 420 and 420', and the third joints 430 and 430', which are connected to the first and second shafts 312 and 321, are rotated together.

If the operation shafts 510 and 510' connected to the third joints 430 and 430' are rotated and the first cams 530 and 530' coupled to the operation shafts 510 and 510' are rotated, the first projection portion 532 is fitted and inserted into the fourth recessed portion 554 of the second cam 550.

As illustrated in FIG. 14A, the first projection portion 532 is rotated by about 45° to be arranged in the transverse direction, and is fixedly fitted into the fourth recessed portion 554.

Although the present invention has been described with reference to the preferred embodiments in the attached figures, it is noted that equivalents may be employed and substitutions made herein without departing from the scope of the invention as recited in the claims.

What is claimed is:

1. A foldable display device comprising:
   a first body and a second body formed in a same plate shape and symmetrically arranged;
   a hinge device coupled to the first body and the second body to make the first body and the second body rotate in a range between an unfolded state in which the first body and the second body are put on a same plane and a folded state in which the first body and the second body overlap each other; and
   an angle maintenance device provided with first and second stopper units capable of fixing a rotating angle of the hinge device to a certain angle;
   wherein the hinge device comprises:
   i) a base plate having first to third step portions formed on an upper surface of the base plate;
   ii) a first rotary body formed on one side of an upper portion of the base plate, the first rotary body fixedly coupled to a side surface of the first body and having a first shaft formed on the first rotary body;
   iii) a second rotary body fixedly coupled to a side surface of the second body and having a second shaft formed on the second rotary body in parallel to the first shaft;
   iv) a center support body penetrated by the first shaft and the second shaft to rotatably support the first rotary body and the second rotary body; and
   v) a first elastic portion and a second elastic portion provided on an outside of the center support body to elastically support the first shaft and the second shaft respectively so that the unfolded state or the folded state can be maintained.

2. The foldable display device according to claim 1, wherein the angle maintenance device comprises:
   first and second rotary interlocking means, connected to the first rotary body and the second rotary body of the hinge device, for rotating in association with the first rotary body and the second rotary body and being bended at multiple angles; and
   the first and second stopper units connected to the first and second rotary interlocking means to adjust the first and second rotary interlocking means at fine angles.

3. The foldable display device according to claim 2, wherein each of the first and second rotary interlocking means comprises:
   a first joint connected to the first shaft of the hinge device to be supported by the first step portion of the base plate;
   a third joint supported by the second step portion and arranged to be spaced apart from the first joint;
   a second joint arranged between the first joint and the third joint; and
   a connecting rod having one side coupled to both end portions of the second joint and the other side coupled to the first joint and the third joint through pins.

4. The foldable display device according to claim 3, wherein the first joint is a hollow cylindrical body, a first cutting groove is formed on both side surfaces of one side of the first joint, and the first cutting groove is formed to communicate with an opening of a front end of the first joint.

5. The foldable display device according to claim 3, wherein the third joint is a hollow cylindrical body, a third cutting groove is formed on both side surfaces of one side of the third joint, and the third cutting groove is formed to communicate with an opening of a front end of the third joint.

6. The foldable display device according to claim 3, wherein the second joint is a hollow cylindrical body, a second cutting groove is formed at both end portions of the second joint at right angles to the first cutting groove and the third cutting groove, and the second cutting groove is formed to communicate with an opening of the both end portions.

7. The foldable display device according to claim 1, wherein each of the first and second stopper units comprises:
- an operation shaft penetrating the second step portion of the base plate to be coupled to the third step portion and having one end connected to the third joint;
- a first cam supported by one side of the second step portion, having a gear drive formed on an outer periphery thereof, and having one surface on which a first projection portion and a first recessed portion are alternately formed to be coupled to the operation shaft; and
- a second cam coupled to the operation shaft, and having one surface on which a third projection portion and a fourth recessed portion are alternately formed to face the first cam.

* * * * *